United States Patent [19]

Palmer

[11] 3,780,955
[45] Dec. 25, 1973

[54] METHOD AND APPARATUS FOR SPREADING A FERTILIZING MATERIAL

[75] Inventor: Harold S. Palmer, Oskaloosa, Iowa

[73] Assignee: Productive Acres Mfg., Co., Oskaloosa, Iowa

[22] Filed: Mar. 22, 1972

[21] Appl. No.: 237,162

[52] U.S. Cl. ............................................. 239/672
[51] Int. Cl. ...................... A01c 19/00, E01c 19/20
[58] Field of Search..................... 239/671, 672, 676

[56] References Cited
UNITED STATES PATENTS

| | | | |
|---|---|---|---|
| 2,538,961 | 1/1951 | Biszantz et al. | 239/672 |
| 2,711,323 | 6/1955 | Bolenbaugh | 239/672 |
| 1,648,658 | 11/1927 | Nirider | 239/671 |
| 2,743,932 | 5/1956 | Wester | 239/672 |
| 2,805,863 | 9/1957 | Klostermann | 239/672 |

Primary Examiner—Lloyd L. King
Attorney—Rudolph L. Lowell

[57] ABSTRACT

The method and apparatus provides for material from the discharge outlet of a vehicle body being divided into a predetermined number of equal but separate streams of material. A spreader belt projected transversely from one side of the vehicle body is divided transversely into sections corresponding in number to one half of the material streams. Each of the material streams is channeled to a corresponding transverse section on a spreader belt, after which the material is levelled to a uniform depth over the complete width of a spreader belt. The material is then progressively discharged to the ground at a constant rate in one direction transversely of a spreader belt and over the longitudinal length of such belt.

4 Claims, 15 Drawing Figures

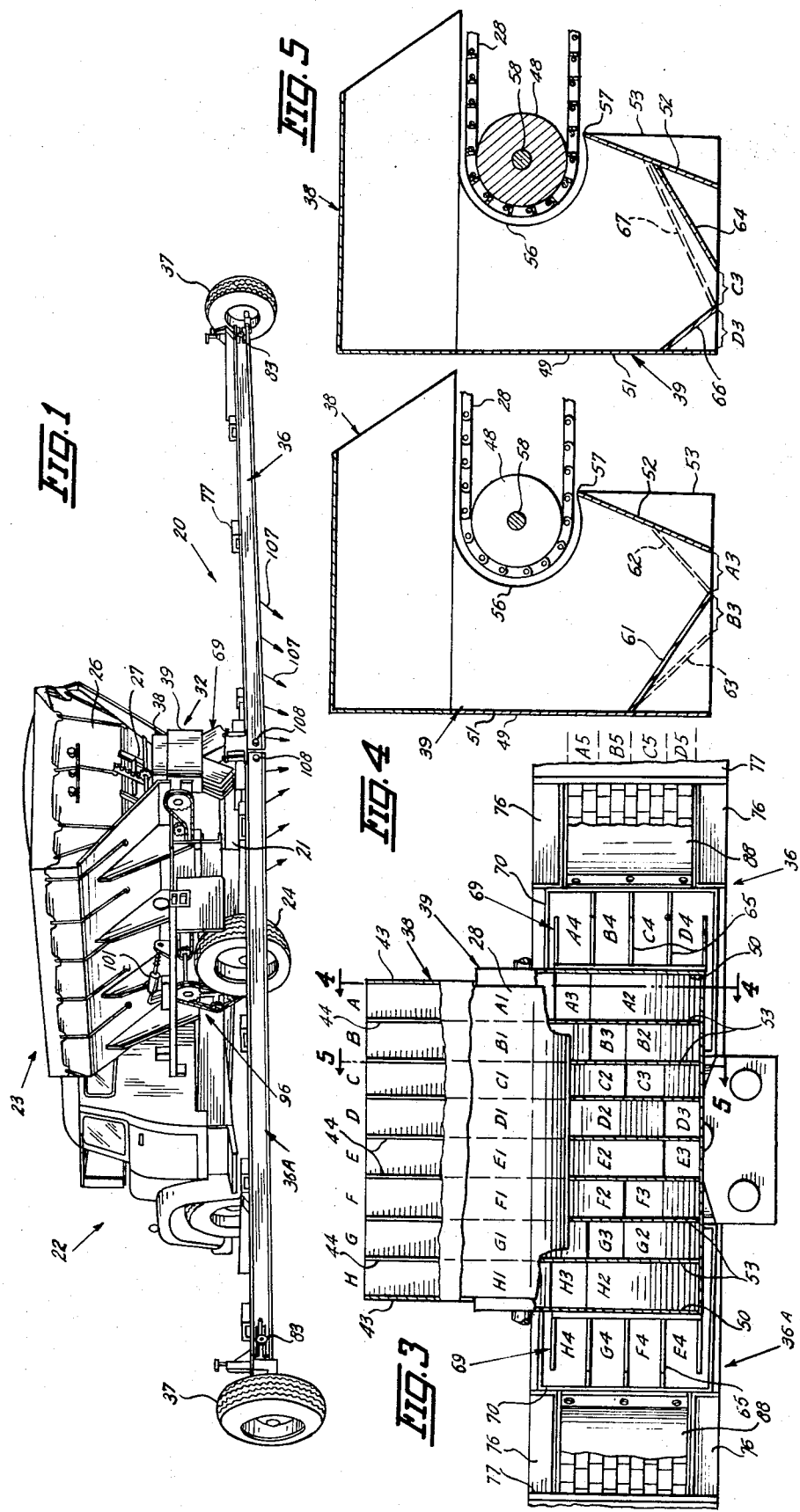

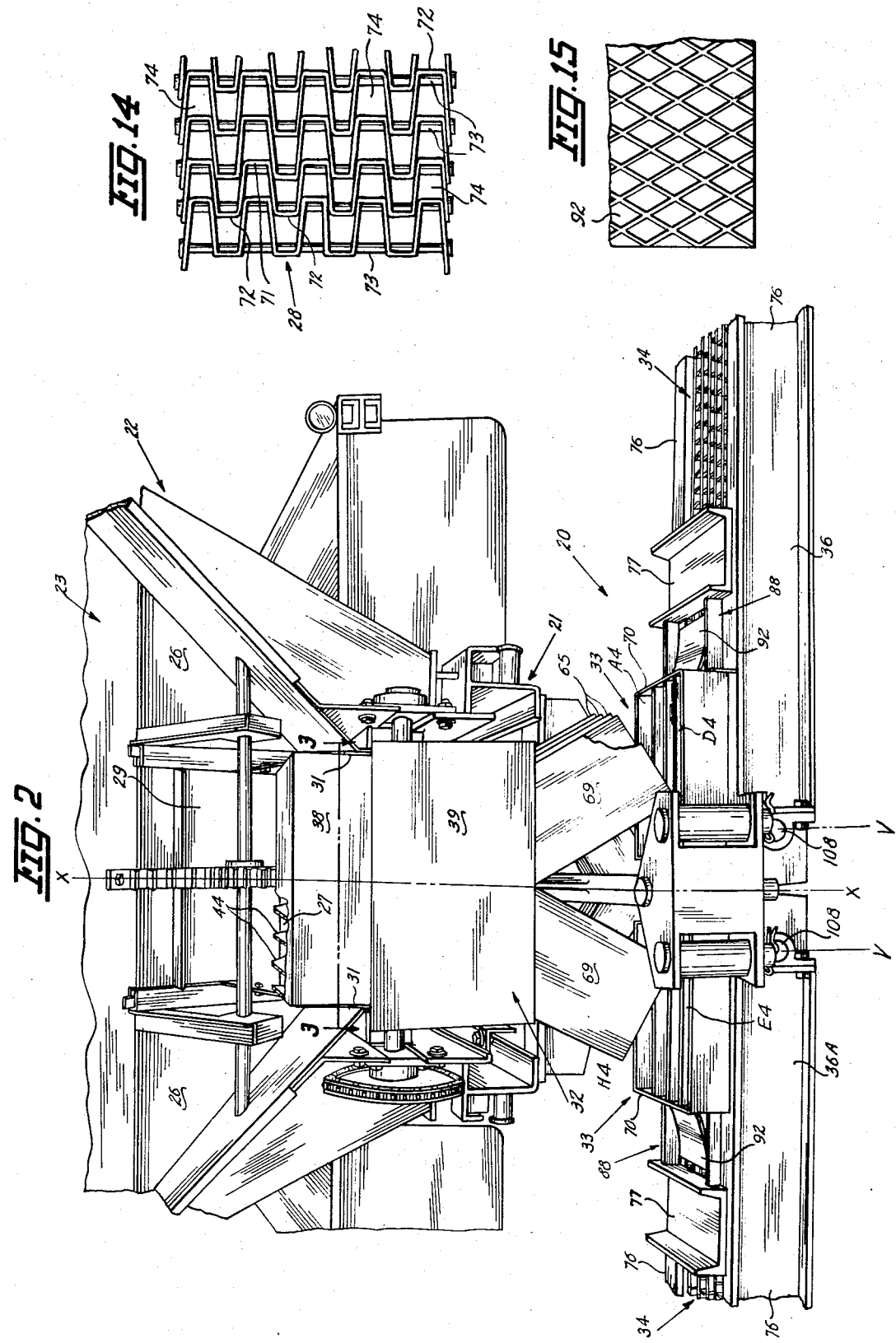

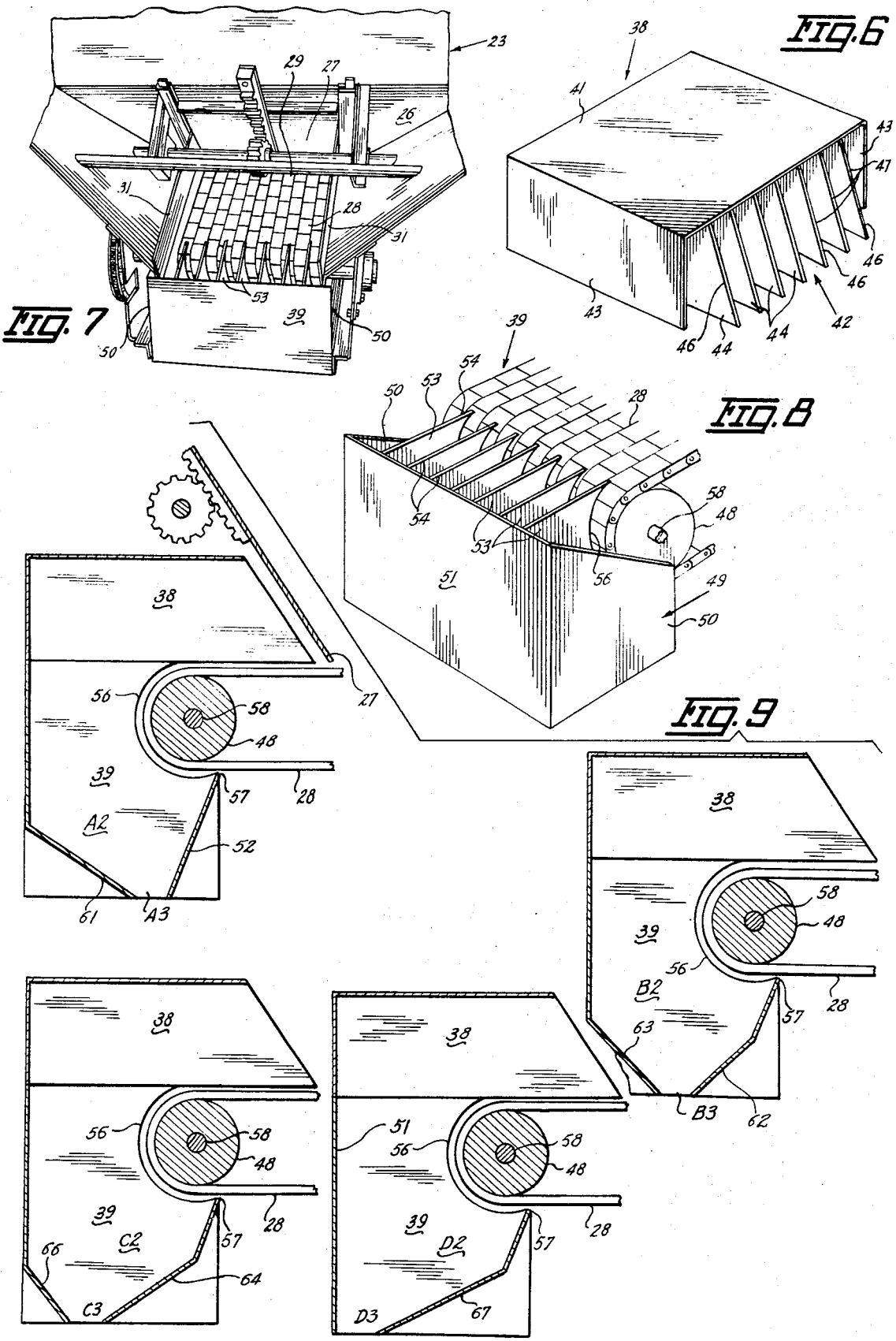

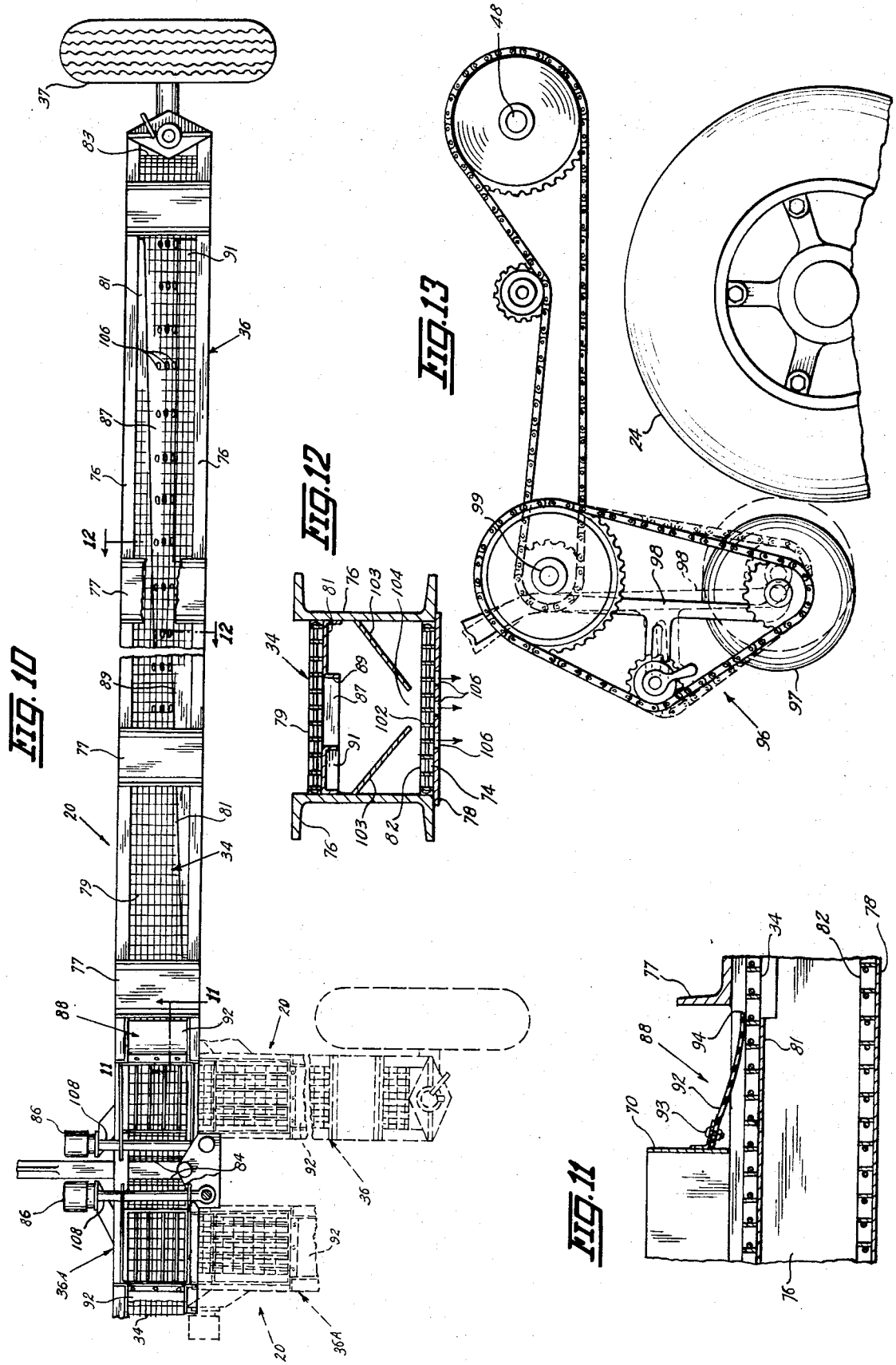

METHOD AND APPARATUS FOR SPREADING A FERTILIZING MATERIAL

SUMMARY OF THE INVENTION

The material spreader apparatus operates efficiently to distribute material uniformly over a ground surface at all speeds of spreader travel. The channeling of all of the material from the vehicle body discharge outlet and its placement at a uniform depth over the whole width of a spreader belt is obtained without the use of any moving parts. On discharge from a spreader belt the material drops through a housing or shield that has a lower side spaced a short distance above the ground surface. The metered material discharged from a spreader belt to the ground is thus shielded against wind action so that uniform spreading can take place under varying weather and wind conditions.

BRIEF DESCRIPTION OF THE DRAWINGS

FIG. 1 is a perspective view of a vehicle showing the assembly therewith of the spreader apparatus of this invention;

FIG. 2 is an enlarged perspective view of the rear portion of the vehicle in FIG. 1 with the spreader apparatus shown foreshortened;

FIG. 3 is a sectional view as seen along the line 3—3 in FIG. 2, showing in plan view a discharge chute assembly that forms part of a distributing unit for directing material to the spreader belt of a spreader unit;

FIGS. 4 and 5 are sectional views taken on the lines 4—4 and 5—5, respectively, in FIG. 3;

FIG. 6 is a perspective view of a divider assembly that forms part of the distributing unit;

FIG. 7 is a perspective view illustrated similarly to FIG. 2 showing the discharge chute assembly;

FIG. 8 is a rear perspective view of the discharge chute assembly;

FIG. 9 is a diagrammatic showing of the discharge chute assembly with the vehicle conveyor and spreader belt illustrating the channeling of streams of material from the vehicle conveyor to corresponding transverse portions of the spreader belt;

FIG. 10 is a foreshortened plan view of one of the spreader units that forms part of the spreader apparatus;

FIGS. 11 and 12 are enlarged sectional views taken on lines 11—11 and 12—12, respectively, in FIG. 10;

FIG. 13 is a side elevational view of the power transmission system for driving the vehicle body conveyor belt;

FIG. 14 is a detail plan view showing the open link construction of the conveyor belt of the vehicle body and spreader belt of a spreader unit; and FIG. 15 is a bottom plan view of a material levelling device for a spreader belt.

DETAILED DESCRIPTION OF THE INVENTION

The spreader apparatus of this invention, designated generally as 20, is symmetrical about a vertical plane which passes through a center line X—X (FIG. 2), with the complete spreader apparatus being shown in FIG. 1 and one-half of the apparatus in FIG. 10. Referring to FIGS. 1 and 2, the spreader apparatus is illustrated as being mounted on the main frame 21 of a vehicle 22, shown as a truck and including a body 23 and rear traction wheels 24. The body 23 is of a flared box type that includes a back wall 26 (FIGS. 2 and 7) provided with an adjustable discharge outlet 27 through which projects the rear end of an endless conveyor belt 28. The box discharge outlet 27 is of a generally rectangular shape and the conveyor belt 28 on leaving the discharge outlet 27 forms a movable bottom wall of a rearwardly projected discharge trough 29 that has side walls 31.

The spreader apparatus 20 (FIGS. 1 and 2) includes a material distributing unit, indicated generally as 32, which is mounted on the vehicle main frame 21 and arranged to receive material from the discharge trough 29 and to distribute such material equally over the receiving ends 33 of a pair of endless spreader belts 34 corresponding to a pair of like spreader units 36 and 36A that project transversely in opposite directions from the vehicle 22. The adjacent inner ends of the spreader units 36 and 36A are movably mounted on the vehicle frame 21 for movement from transversely extended operating positions shown in FIGS. 1 and 10 to transport positions projected rearwardly in a trailing relation with the vehicle 22 as shown in dotted lines in FIG. 10. Ground wheels 37 at the outer ends of the spreader units 36 and 36A are manually movable to an adjusted position corresponding to the operating or transport position of the spreader units 36 and 36A.

The distributing unit 32 includes a divider assembly 38 and a discharge chute assembly 39. The divider assembly 38 (FIG. 6) includes a body member 41 of a generally inverted box shape having an open forward side 42 and opposed side walls 43. Extended longitudinally of and spaced equal distances apart transversely of the box member 41 and between the side walls 43 are a plurality of divider or partition members 44. The body member 41 is thus divided into eight longitudinally extended sections, indicated as A-H, inclusive (FIG. 3). These sections A-H, inclusive, correspond to eight equal sections A1-H1, inclusive, that extend longitudinally of the conveyor belt 28 and have combined transverse dimensions equal to the width of the conveyor belt. In this respect, it is to be noted that each section A-H, inclusive, of the divider assembly 38 has a transverse dimension, equal to the transverse dimension of one of the conveyor belt sections A1-H1, inclusive.

The partition members 44 are of a height equal to the height of the box side walls 43 and have front end sections 46 projected forwardly through the open front side 42 of the body member 41 (FIG. 6). These projected ends 46 have forwardly and downwardly inclined upper surfaces 47 corresponding to the upward and rearward inclination of the back wall 26 of the vehicle body 23. The divider assembly 38 is positioned within the vehicle discharge trough 29 with the side walls 43 thereof located to the inside of the trough walls 31 and with the front inclined surfaces 47 in abutting engagement with the rear surface of the back wall 26 of the vehicle body 23. When thus located, and as appears in FIGS. 4 and 5, the divider assembly 38 is contiguous to the flat surface of the vehicle conveyor belt 28 and projects rearwardly beyond the rear supporting roller 48 for the conveyor belt 28. The divider assembly 38 thus functions to divide the material passing through the vehicle box discharge outlet 27 into separate equal streams of material. Stated otherwise, the divided material streams are substantially equal in transverse cross sectional area to provide for an equal rate of volume flow of material in each stream.

The material streams from the vehicle trough 29 are discharged into the chute assembly 39 of the distributing unit 32 for separate channeling to corresponding ones of the spreader belt 34. The chute assembly 39 (FIGS. 7 and 8) includes a frame structure 49 of a generally rectangular shape having a pair of upright opposed side walls 50, a rear wall 51, and a front wall 52. The frame structure 49 is divided transversely between the side walls 50, by partition plates 53, into sections A2–H2, inclusive, corresponding respectively to the sections A–H, inclusive, of the divider assembly 38 (FIG. 3). As shown best in FIG. 7, the side walls 50 of the frame structure 49 are located to the outside of and below the side walls 31 of the vehicle discharge trough 29, so that all of the partition plates 53 are located within the confines of the trough side walls 31.

With the partition plates 53 spaced a distance apart, equal to the transverse spacing of the dividers 44 of the divider assembly 38, and located with their upper sides 54 substantially in the plane of the lower sides of the divider plates 44, it is seen that the dividers 44 and the partition plates 53 form continuous upright walls which extend vertically of the distributing unit 32. In this respect, it is to be noted that the side walls 43 of the body member 41 are located inwardly of correspondingly opposed side walls 50 of the frame structure 49. As a result, the outer chute sections A2 and H2 of the discharge chute assembly 39 are of a slightly greater width than the remaining sections thereof. The chute sections A2 and H2 are thus capable of receiving any seepage material from the sides of the conveyor belt 28 along with providing for the side walls 50 functioning as mounting plates for the discharge chute assembly 39.

Each of the partition plates 53 (FIGS. 4 and 5) is formed at its upper forward end with a cutaway portion 56 of an arcuate shape corresponding to the circular shape of the rear roller 48 for the vehicle conveyor belt 28 which travels in a concentrically spaced relation within the cutaway portions 56. It is seen that the forward ends 57 of the cutaway portions 56 are located forwardly of the shaft 58 of the roller 48. The front wall 52 of the frame structure 49 extends downwardly and rearwardly from the front ends 57 of the cutaway portions 56. As a result, material from the conveyor belt 28 is completely removed or discharged into the chute assembly 39 as the belt 28 travels about the roller 48.

Thus, each chute section A2–H2, inclusive, with its associated partition plates 53 and side walls 50 of the frame structure 49 form separate upright chutes or hoppers that are spaced transversely of the vehicle conveyor belt 28. If the material from the conveyor belt 28 was permitted to fall vertically through the chute sections of the assembly 39, it is apparent that such material would fall on a common transverse section of a spreader belt 34 when in a transversely extended operating position. To distribute the material from the vehicle conveyor belt 28 uniformly over the transverse width of a spreader belt 34, the chute sections A2–H2, inclusive, have their lower ends formed with corresponding discharge outlets A3–H3, inclusive, relatively spaced longitudinally and transversely of the discharge assembly 39 (FIG. 3).

As previously described, the vehicle conveyor belt 28 is divided by the divider assembly 38 to discharge eight equal streams of material. Likewise, the chute assembly 39 is divided into eight receiving hoppers or chutes A2–H2, inclusive, corresponding to the material streams. The chute assembly 39 functions to direct four of these eight material streams to each one of the two spreader units 36 and 36A. Thus, the chute sections A2–D2, inclusive, discharge material therefrom to the spreader belt 34 of one of the spreader units 36 and the chute sections E2–H2, inclusive, discharge material to the spreader belt 34 of the other spreader unit 36A. Since the structure and operation of the chute assembly 39 relative to the spreader units 36 and 36A are identical, only the chute sections A2–D2, inclusive, for the spreader belt 34 of the spreader unit 36 will be described in detail with like numbers being applied to corresponding parts of the spreader unit 36A.

The discharge outlets A3–D3, inclusive, (FIG. 3) are of a square shape in transverse cross section and equal in size. Each outlet A3–D3, inclusive, is located rearwardly of a corresponding transverse section A1–D1, inclusive, of the conveyor belt 28. The discharge outlet A3 for the chute section A2 is located adjacent the discharge end of the conveyor belt 28 and the remaining discharge outlets B3, C3 and D3 for the chute sections B2, C2 and D2, respectively, are located progressively rearwardly and inwardly from the discharge outlet A3. The chute discharge outlets are thus in a stepped relation so as to have one of their diagonal center lines lying in a common plane.

As shown in FIG. 4, the discharge outlet A3 for the chute section A2 is defined by the lower edge of the front wall 52 of the frame structure 49 and the lower edge of a rear bottom wall member 61 that is inclined downwardly and forwardly from the rear wall 51 of the frame structure 49. The discharge outlet B3 for the chute section B2 is defined by reversely inclined front and rear bottom wall members 62 and 63, respectively. Similarly, and as shown in FIG. 5, the discharge outlet C3 is defined by the lower edges of reversely inclined front and bottom wall members 64 and 66, respectively, and the outlet D3 by the lower edge of the wall 51 and downwardly and rearwardly inclined front bottom wall member 67. The inclined rear bottom wall 61, 63 and 66 are of progressively decreasing lengths for the chute sections A2–C2, inclusive, respectively.

This relative construction of the chute sections and arrangement of the discharge outlets provides for the discharge of a stream of material from the vehicle conveyor belt 28 downwardly into a chute section concurrently with the material stream being directed longitudinally of the conveyor belt 28 to a position above a corresponding transverse section of the spreader belt 34. This function of the chute assembly is illustrated in diagrammatic form in FIG. 9 wherein the chute sections A2–D2, inclusive, are separated from each other and relatively associated with corresponding transverse sections of the vehicle conveyor belt 28 and spreader belt 34.

Thus, the material stream from the conveyor belt section A1 on being discharged into the chute section A2 is directed by the wall members 52 and 61 into the discharge outlet A3 for delivery to a corresponding transverse section A5 of the spreader belt 34 (FIGS. 3 and 9). Similarly the material streams from the transverse sections B1–D1, inclusive, of the conveyor belt 28 are discharged into the chute sections B2–D2, inclusive, and directed onto corresponding transverse sections B5–D5, inclusive, on the spreader belt 34. The separate material streams are thus simultaneously discharged through the outlets A3–D3, inclusive, onto the corresponding transverse sections A5–D5, inclusive, of the spreader belt 34, which are equal in size transversely of the belt 34 and extend over the full width of the spreader belt. In this respect it will be noted that the width of the spreader belt 34 is equal to the combined dimensions of the discharge outlets A3–D3, inclusive, which extend transversely of the belt 34.

To reduce loss of material during transfer from the discharge outlets onto the spreader belt 34 as a result of wind action or transverse tilting of the vehicle 22, the distributing unit 32 (FIGS. 2 and 3) includes a slide structure 69 that has separate slide sections 65 corresponding to the discharge outlets A3–D3, inclusive. Thus, material from the discharge outlets is carried by the slide structure 69 into corresponding open bins or pockets A4–D4, inclusive, located adjacent to and above the receiving end of the spreader belt 34. The bins have an upright wall 70 which is common to all of the bins and extends transversely of the belt 34. The bins A4–D4, inclusive, function to confine the material from the discharge outlets A3–D3, inclusive, within the confines of corresponding transverse sections A5–D5, inclusive, on the spreader belt 34.

The vehicle conveyor belt 28 and the spreader conveyor belt 34 are of a similar construction except for the vehicle belt having a width equal to about twice the width of the conveyor belt 34. Each of these belts is of an open construction and comprised of a plurality of pivoted transversely extended link members 71 (FIG. 14). Each link member 71 is formed from a single piece of a strap material into a series of alternately inverted U-shape sections 72. Adjacent links 71 are arranged in a nested relation and connected together for relative pivotal movement by pivot pins 73 extended through the apices of the U-shape sections 72. Each belt 28 and 34 is thus formed with a plurality of openings 74 formed between adjacent link members 71.

The spreader belt 34 is of endless type and extends longitudinally of the spreader unit 36 that has a frame structure which includes a pair of opposed side channel members 76 (FIG. 12). These channel members 76 face outwardly and are connected together at their top sides by longitudinally spaced transverse connecting members 77 and at their bottom sides by a longitudinally extended plate member 78 that extends over the full length of the side channels 76.

The upper length 79 of the spreader belt 34 (FIGS. 10 and 12) is supported on a base plate 81 spaced downwardly from the upper surfaces of the side channels 76 and positioned therebetween over substantially the full length of the side channels. The base plate 81 and the sections of the side channels extended upwardly therefrom form a receiving trough for the upper length 79 of the spreader belt. The sections of the side channels 76 which project downwardly from the base plate 81 form with the base plate and the plate member 78 a tubular housing within which the lower length 82 of the spreader belt 34 travels on the upper surface of the plate member 78. The spreader belt 34 is supported at the outer end of the spreader unit 36 on a roller 83 (FIG. 10) and at the inner end of the unit on a drive roller 84 which is driven by a hydraulic motor 86 connected with a source of high pressure oil (not shown) provided on the vehicle 22.

The base plate 81 (FIGS. 10 and 12) constitutes a material metering means for the spreader belt 34 and for this purpose is formed with a progressively widening discharge opening 87 which extends from a levelling device 88 mounted on the wall 70 of the bins A4–D4, inclusive, to the outer support roller 83 of the spreader belt 34. The discharge opening 87 is continuous in the direction of travel of the upper length 79 of the belt 34 and extends diagonally between the side channels 76. The discharge opening 87 is formed by tapering a longitudinal edge 89 of the base plate 81. Thus, at about half the distance to the outer end of the spreader unit 36 the spreader belt 34 would normally tend to become unbalanced since one side thereof would be without any support on the base plate 81. To provide a balanced support for the belt, a flange member 91 is extended inwardly along the side channel opposite the tapered edge 89 over substantially the outer half length of the spreader unit 36.

In operation, therefore, the material received in the open bottom bins A4–D4, inclusive, falls into the belt openings 74 which, with the base plate 81, form material receiving pockets having a depth equal to the thickness of the spreader belt 34. The spreading of the material to a uniform depth transversely of the belt 34 is accomplished by the levelling device 88 (FIG. 11) which is comprised of a flat resilient member 92 formed of a thick rubber material or the like. The under surface of the rubber member 92 (FIG. 15) is irregular and as illustrated consists of raised marginal edges defining diamond shapes. One side of the levelling member 92 (FIG. 11) is suitably secured as indicated at 93 to the wall 70 of the bins A4–D4, inclusive, and extends outwardly and downwardly from the wall 70 for the yieldable rinding engagement of its outer end 94 on the top surface of the spreader belt 34. With the member 92 of a transverse width equal to that of the belt 34, the yieldable engagement of its outer end 94 on the top surface of the belt 34 functions as a levelling edge to uniformly distribute the material over the spreader belt.

With the material levelled to a uniform depth over the full width of the conveyor belt 34 on the movement of the belt upper length 79 toward the outer end of the spreader unit 36, the material is progressively discharged in one direction transversely of the belt over the tapered edge 89 of the opening 87. Since the tapered edge 89 extends diagonally of the upper length 79 of the belt, the material is discharged at a uniform volume rate over the entire length of the spreader unit 36.

As shown in FIGS. 1 and 13, the drive roller 48 of the vehicle conveyor belt 28 is driven from one of the vehicle rear wheels 24 by a power transmission assembly, indicated generally as 96, that includes a friction wheel 97 mounted on a pivoted arm 98 carried on a sprocket shaft 99. The wheel 97 is moved into and out of engagement with the vehicle wheel 24 by an actuating hydraulic cylinder 101, shown in FIG. 1. The rate of volume discharge of material over the edge 89 of the opening 87 is varied in direct response to the speed of travel of the vehicle 22 to provide for a uniform ground spreading of the material.

Referring to FIG. 12, it is seen that the material moved from the tapered or metering edge 89 is directed downwardly between the side channels 76 so as to fall onto the transverse central portion 102 of the lower length 82 of the spreader belt 34. For this purpose there is provided a pair of reversely inclined downwardly projected deflector plates 103 corresponding to and secured to the side channels 76 with the lower ends thereof transversely spaced to form an opening 104 located above the belt transverse section 102 and extended the full length of the tapered edge 89. Material from the opening 104 falls into the openings 74 in the belt lower length 82 and onto the plate member 78, which is formed with longitudinally spaced transverse rows of discharge holes 106 (FIGS. 10 and 12). The holes 106 are of an elliptical shape so as to be elongated in the direction of belt travel.

Material from the opening 104 is thus permitted either to fall into the belt openings 74 onto the plate member 78 for movement by the belt progressively through the plate openings 106 or to fall directly to the ground through aligned belt openings 74 and plate openings 106. As indicated by the arrows 107 in FIG. 1, the directional movement of the lower length 82 of the spreader belt 34 directs the material downwardly and inwardly of the spreader units 36 and 36A as it falls to the ground surface from the openings 106. As a result of this directional fall imparted to the material the ground space confined between the inner roller shafts 108 (FIG. 2) and included between the vertical lines indicated at V, receives a uniform distribution of the material. The material is thus uniformly spread over the complete length of the spreader apparatus 20.

It is to be further noted that the material to be spread remains substantially enclosed from the time it leaves the vehicle body 23 until it drops to the ground through the plate openings 106. The material is thus shielded against the action of wind which would normally interfere with a uniform spreading operation. Additionally, by completely enclosing the lower length 82 of the belt 34 and providing for the riding engagement thereof on the top surface of the plate member 78 a non-uniform dispersement of material that would otherwise occur by a free falling of the material onto the belt is completely eliminated.

Although the invention has been described with respect to a preferred embodiment thereof, it is to be understood that it is not to be so limited since changes and modifications can be made therein which are within the full intended scope of this invention as defined by the appended claims.

I claim:

1. A material spreading apparatus for a vehicle body having a material discharge outlet and an endless conveyor belt with a flat upper surface for conveying material through said discharge outlet comprising:
    a. a trough attachable transversely of the vehicle body having opposed side walls, a flat bottom wall formed with a discharge opening having a discharge edge extended diagonally of the trough side walls, and a material receiving end,
    b. a flat endless spreader belt of an open construction having an upper run movable over said bottom wall longitudinally of the trough,
    c. a material distributing unit mounted on said vehicle including a divider assembly for dividing the upper surface of said conveyor belt at said discharge outlet into a predetermined number of equal transversely extended sections, and
    d. a discharge unit having discharge chutes corresponding in number to said transverse sections, each discharge chute having an inlet to receive only the material from a corresponding transverse section and an outlet to discharge said material onto a corresponding transversely extended portion of said spreader belt at the material receiving end of said trough, said transverse portions being of equal size and of a combined transverse length equal substantially to the width of said spreader belt.

2. The fertilizer spreader according to claim 1 wherein:
    a. said flat spreader belt forms with said bottom wall a plurality of material carrying pockets, and
    b. means on the receiving end of said trough for levelling the material to a uniform depth over the width of said spreader belt.

3. The fertilizer spreader according to claim 2 wherein:
    a. said levelling means includes a yieldable member having a levelling edge extended transversely of and in engagement with the upper surface of said belt.

4. The fertilizer spreader according to claim 1 including:
    a. a downward extension on each of said opposed side walls coextensive in length with a side wall,
    b. a material discharge plate extended between and connected to the lower edges of said extensions in a vertically spaced relation with said bottom wall, said flat endless spreader belt having a lower run movable over said discharge plate, and
    c. means for directing material from the discharge opening in said bottom wall onto the longitudinally extended transverse central portion of said discharge plate, said central portion having longitudinally spaced discharge holes therein whereby material from said discharge opening drops into and is moved by said lower run through said discharge holes.

* * * * *